United States Patent [19]

Martin et al.

[11] Patent Number: 5,159,644
[45] Date of Patent: Oct. 27, 1992

[54] CHARACTER RECOGNITION METHOD USING STATISTICALLY WEIGHTED CORRELATION

[75] Inventors: Gregory J. Martin, Canandaigua, N.Y.; Robert Y. Chen, Seattle, Wash.; John F. Cook; James A. Mason, both of Rochester, N.Y.

[73] Assignee: Eastman Kodak Company, Rochester, N.Y.

[21] Appl. No.: 752,800

[22] Filed: Aug. 30, 1991

[51] Int. Cl.$^5$ .............................................. G06K 9/62
[52] U.S. Cl. ...................................... 382/14; 382/15; 395/21; 395/23
[58] Field of Search ...................... 382/14, 15, 42, 30, 382/34; 395/21, 20, 23, 77

[56] References Cited

U.S. PATENT DOCUMENTS

| | | | |
|---|---|---|---|
| 4,177,448 | 12/1979 | Brayton | 382/14 |
| 4,764,973 | 8/1988 | O'Hair | 382/15 |
| 5,058,180 | 10/1991 | Khan | 382/15 |
| 5,060,277 | 10/1991 | Bokser | 382/15 |
| 5,086,479 | 2/1992 | Takenaga et al. | 382/15 |

Primary Examiner—Joseph Mancuso
Attorney, Agent, or Firm—Raymond L. Owens

[57] ABSTRACT

A character recognition method comprising the following steps: (1) acquiring a two dimensional array of pixels, (2) locating an unknown character in the two dimensional array, (3) computing statistically weighted correlation coefficients between the unknown character and a trained set of characters (i.e. a font), (4) recognizing the unknown character as the trained character with the highest correlation coefficient above a threshold. The weights in the correlation calculations are adjusted to place more emphasis on those areas of a character that exhibit less noise and less emphasis on those areas of the character that exhibit more noise. A method for determining and using these weights is described herein.

2 Claims, 6 Drawing Sheets

CHARACTER RECOGNITION METHOD USING STATISTICALLY WEIGHTED CORRELATION

FIELD OF THE INVENTION

This invention relates to weighted correlation methods for performing character recognition whereby the best match (i.e. highest correlation score) is used to select and classify an unknown character as a member of a trained set of characters. The correlations are computed from the two dimensional array of pixels for the unknown character and for the training set of characters. In this specification, the term font training denotes the process of creating and storing all of the trained characters in a font. The term inspect denotes the process of recognizing each unknown character as one of the trained characters of a font. In this invention, the light value of each pixel is weighted to place more or less emphasis on its contribution to the overall correlation score. The weights are adjusted so as to minimize the influence of non-stationary noise on the correlation score. The method for determining and using these weights is described herein.

BACKGROUND OF THE INVENTION

Correlation is a technique well known to those skilled in the art of developing character recognition methods. The process of recognizing an unknown character using correlation is comprised of the following steps: (1) acquiring a two dimensional array of pixels, (2) locating an unknown character in the two dimensional array, (3) computing the correlations between the unknown character and every member of a trained set of characters (otherwise known as a font), (4) recognizing the unknown character as the trained character with the highest associated correlation coefficient above a threshold.

The correlation between an unknown character and a trained character can be conveniently described using vector notation. That is, let the vector y denote the light values (relative scene reflectance, intensity, etc.) of the pixels of the unknown character to be recognized. That is, let $$y = [y_1, y_2, \ldots, y_N]^T \tag{1}$$

where $y_i$ denotes the light value of the i-th pixel of the unknown character and $()^T$ denotes the transpose operator. In this representation there are N pixels in the unknown character y. That is, the two dimensional array of pixels for the unknown character is represented as a one dimensional array by concatenating rows (or columns) into a single vector.

In a similar manner, let x denote the vector of light values of a trained character from a font, i.e.

$$x = [x_1, x_2, \ldots, x_N]^T \tag{2}$$

where $x_i$ denotes the light value of the i-th pixel of the trained character x. For simplicity, it is assumed that both the unknown character and the trained character have the same number of pixels, N. If this were not true, the two vectors can be made the same size by appropriately increasing/decreasing the size of the unknown character y to that of the trained character x by utilizing the surrounding pixels in the image.

With these definitions, a normalized mean-corrected correlation (squared) $R^2_{xy}$ between the unknown character y and the trained character x can be written as $$R^2_{xy} = \frac{[x_c^T y_c]^2}{[x_c^T x_c][y_c^T y_c]} \tag{3}$$

where $$x_c = x - \mu_x \tag{3a}$$

$$y_c = y - \mu_y \tag{3b}$$

are the mean-corrected character vectors and $$x_c^T = [x_{c,1}, x_{c,2} \cdots x_{c,N}]^T \tag{3c}$$

$$y_c^T = [y_{c,1}, y_{c,2} \cdots y_{c,N}]^T \tag{3d}$$

and the i-th components of the mean vectors are given by $$(\mu_x)_i = \Sigma x_i / N, \; i = 1, 2, \ldots, N \tag{3e}$$

$$(\mu_y)_i = \Sigma y_i / N, \; i = 1, 2, \ldots, N \tag{3f}$$

According to the above description, $R^2_{xy}$ is computed for all M trained characters of the font $\{x_1, x_2, \ldots, x_M\}$ and the unknown character y is identified as that trained character $x_i$ that results in the highest correlation score among all the scores calculated.

An additional condition for a match is that the highest correlation score $(R^2_{xy})_{max}$ exceed some predetermined threshold $(R^2_{xy})_{thresh}$. Otherwise, the unknown character does not match any trained characters.

The correlation (squared) as defined in equation (3) has several desirable properties. Namely, the correlation $R^2_{xy}$ in equation (3) is insensitive to variations in illumination level and character contrast. That is, doubling the intensity or contrast of unknown character y does not affect the correlation score. This is a result of the normalization and mean-correction of equation (3) and can be easily proved (by those skilled in the art).

Equation (3) shows that the correlation squared $R^2_{xy}$ is computed rather than the correlation $R_{xy}$. This is done as a mathematical convenience to avoid having to compute the square root. Note that $R^2_{xy}$ as given by equation (3) is bounded in the range of 0.00 to 1.00. In practice, the correlation (squared) is usually multiplied by 100 to provide a more convenient 0 to 100 scale.

By substituting equations (3a) thru (3f) into equation (3), $R^2_{xy}$ can be written in a computationally efficient form as $$R^2_{xy} = \frac{\left[N \sum_{i=1}^{N} x_i y_i - \left(\sum_{i=1}^{N} x_i\right)\left(\sum_{i=1}^{N} y_i\right)\right]^2}{\left[N \sum_{i=1}^{N} x_i^2 - \left(\sum_{i=1}^{N} x_i\right)^2\right]\left[N \sum_{i=1}^{N} y_i^2 - \left(\sum_{i=1}^{N} y_i\right)^2\right]} \tag{4}$$

In this expression, the summations involving only $x_i$ can be computed prior to inspection. Thus, there are only three summations that need to be computed during an inspection: the cross-product term and the sum and sum-squared of $y_i$. This results in a computationally fast algorithm.

The above describes the state of the art in performing character recognition using correlation of the light value of pixels of an unknown character with the various trained characters of a font. However, there are several deficiencies associated with the above method.

The first deficiency is the inability to accommodate variations in the print quality of acceptably good characters. That is, there is a range of print quality that is considered acceptable. Beyond this range the character should be judged as unacceptable. Within this range, the character recognition method should recognize and classify the character as acceptable without significant changes in the correlation score. Thus, a modification of the above correlation method is required to take into account the range of acceptably good variability associated with each trained character x.

The second deficiency is the inability to accommodate non-stationary sources of noise, such as the noise associated with sampling and digitization artifacts during the capture of a video image. These sampling artifacts result in greater noise in areas of a character where there are edges as opposed to areas of a character where the reflectance is uniform. This source of noise implies that the pixel data for the character that was trained will not always exactly match the pixel data for the same character when it is being inspected.

The third deficiency is the reduction in the correlation score when the character is rotated slightly during inspection compared to when it was trained.

Thus, a computational and memory efficient character recognition method is desired that overcomes the deficiencies associated with the above correlation computation. That is, a character recognition method using correlation is desired that places less emphasis on those pixels of a character that have higher expected noise variations and more emphasis on those pixels that have lower expected noise variations.

SUMMARY OF THE INVENTION

This invention describes a character recognition method based on statistically weighted correlation. In this invention, there are two separate processes in performing character recognition: font training and inspect. During font training, the trained characters are created and stored to memory for later use during inspect. During inspect, unknown characters are recognized using the trained characters in a manner described herein.

This invention provides a compute and memory efficient approach that overcomes the above mentioned deficiencies. The statistical weights are designed to place less emphasis on those pixels of a character that have higher noise variations when computing a correlation coefficient and more emphasis on those pixels that have lower noise variations. In addition, mean vectors are used for each trained character in the font rather than a single "golden" observation vector. A method for determining the weights and computing the weighted correlation coefficient is described herein.

Weighted correlation is quite similar to weighted regression. It is best described by introducing a weight (squared) matrix $Z_x$ for each trained character x in the font. The $Z_x$ is an NxN matrix defined by $$Z = W^2 \tag{5}$$

where $$Z = \begin{bmatrix} z_1 & & & \\ & z_2 & & 0 \\ & & \cdot & \\ & & & \cdot \\ 0 & & & \cdot \\ & & & & z_N \end{bmatrix} = \tag{6}$$

$$\begin{bmatrix} w_1^2 & & & \\ & w_2^2 & & 0 \\ & & \cdot & \\ & & & \cdot \\ 0 & & & \cdot \\ & & & & w_N^2 \end{bmatrix}$$

Although $Z_x$ is an NxN matrix, there are only N non-zero terms along the main diagonal. The off-diagonal terms being zero are a direct result of assuming that the noise associated with each pixel is uncorrelated with the noise of every other pixel in the trained character. The main diagonal terms of $Z_x$ correspond to the individual weights (squared) for each pixel in the trained character x. Hence, only the weight vector $w = [w_1, w_2, \ldots, w_N]^T$ need be computed and stored for each trained character x and not the entire matrix $Z_x$.

In order to use a statistically weighted correlation when implementing a character recognition method, a procedure must be available for estimating the weights for each trained character in the font and for updating these weights as new observations for each trained character are made. It is also desired that the weight estimation method be computationally efficient and that minimal memory be required for storing the vectors for each trained character. A procedure is described herein for computing the weights for each trained character in the font and for recursively updating the weights as more observations of each trained character occur.

Assuming that a trained character x has K observations $\{x_1, x_2, \ldots, x_K\}$, then the mean vector $m_x(K)$ and mean-square vector (squared) $q^2_x(K)$ for trained character x are given as $$m_x(K) = \frac{\sum_{i=1}^{K} x_i}{K} \tag{7}$$

and $$q_x^2(K) = \frac{\sum_{i=1}^{K} x_i^2}{K} \tag{8}$$

From these two vectors, a variance vector $\sigma^2 x(K)$ can be computed and is given by $$\sigma_x^2(K) = \frac{\sum_{i=1}^{K} [x_i - m_x(K)]^2}{K} \tag{9}$$

$$= q_x^2(K) - m_x^2(K) \tag{10}$$

From the square root of the variance vector, the weight vector $w_x(K)$ for the trained character x is computed as $$w_x(K) = c/\sigma_x(K) \tag{11}$$

where c is a constant used to scale the weights to the range of 0 to 255, suitable for storage as unsigned bytes and thus conserving memory usage.

Equations (7) thru (11) give the expressions for computing the weight vector given K observations of the trained character x. The following equations show how the above quantities can be recursively updated as each new observation of a trained character x occurs. That is, the K+1 mean vector is computed from the k-th mean vector and the k+1 observation vector as:

$$m_x(K+1) = \frac{K \cdot m_x(K) + x_{K+1}}{K+1} \tag{12}$$

Similarly, $$q_x^2(K+1) = \frac{K \cdot q_x^2(K) + x_{K+1}^2}{K+1} \tag{13}$$

$$\sigma_x^2(K+1) = q_x^2(K+1) - m_x^2(K+1) \tag{14}$$

and $$w_x(K+1) = c/\sigma_x(K+1). \tag{15}$$

The modification of equation (3) to include the pixel weighting results in a weighted normalized mean-corrected correlation (squared) $R^2_{xy}$ given by $$R^2_{xy} = \frac{[m_{xc}^T Z_x y_c]^2}{[m_{xc}^T Z_x m_{xc}][y_c^T Z_x y_c]} \tag{16}$$

where $$m_{xc} = m_x - \mu_x \tag{16a}$$

and $$y_c = y - \mu_y \tag{16b}$$

are the mean-corrected vectors and $$m_{xc}^T = [m_{xc,1} m_{xc,2} \cdots m_{xc,N}]^T \tag{16c}$$

$$y_c^T = [y_{c,1} y_{c,2} \cdots y_{c,N}]^T \tag{16d}$$

The i-th components of the mean vectors are given by $$(\mu_x)_i = \Sigma m_{xi}/N, \ i=1,2,\ldots,N \tag{16e}$$

$$(\mu_y)_i = \Sigma y_i/N, \ i=1,2,\ldots,N \tag{16f}$$

and $Z_x$ is the weight (squared) matrix as defined previously in equations (5) and (6) and whose main diagonal is composed of the vector $w_x$ as computed from equation (11). In the above equations, the index K has been dropped for notational simplicity.

A computationally efficient form of equation (16), similar to that of equation (4), can also be developed. Substitution of equations (16a) thru (16f) into equation (16) and defining a weighted sum vector $m_{wx}$ as $$m_{wx} = W \cdot m_x \tag{17}$$

$$= [w_{x1}m_{x1}, w_{x2}m_{x2}, \ldots, w_{xN}m_{xN}]. \tag{18}$$

with a little rearrangement, results in an expression for $R^2_{xy}$ given by $$R^2_{xy} = \frac{\left[N \sum_{i=1}^{N} m_{wxi} w_{xi} y_i - \left(N \sum_{i=1}^{N} m_{wxi}\right)\left(N \sum_{i=1}^{N} w_{xi} y_i\right)\right]^2}{\left[N \sum_{i=1}^{N} m_{wxi}^2 - \left(\sum_{i=1}^{N} w_{xi}\right)^2\right]\left[\left(N \sum_{i=1}^{N} w_{xi} y_i\right)^2 - \sum_{i=1}^{N} w_{xi} y_i\right)^2\right]} \tag{19}$$

The summations involving just $m_{wx}$ can be precomputed prior to runtime inspection. That is, by defining the quantities $$S_x = \left(\sum_{i=1}^{N} m_{wxi}\right) \tag{20}$$

and $$RSS_x = \left[N \sum_{i=1}^{N} m_{wxi}^2 - \left(\sum_{i=1}^{N} m_{wxi}\right)^2\right]^{-1}, \tag{21}$$

then $R^2_{xy}$ can be expressed as $$R^2_{xy} = \frac{\left[N \sum_{i=1}^{N} w_{xi} y_i - S_x \left(\sum_{i=1}^{N} w_{xi} y_i\right)\right]^2 \cdot RSS_x}{\left[N \sum_{i=1}^{N} w_{xi} y_i\right)^2 - \left(\sum_{i=1}^{N} w_{xi} y_i\right)^2\right]}. \tag{22}$$

Computing $R^2_{xy}$ in this fashion results in a considerable savings in computation time as opposed to computing $R^2_{xy}$ from equation (16). That is, equation (16) implies a two pass algorithm. The first pass involves computing the mean corrected vectors using equations (16a) and (16b). The second pass involves computing the correlation coefficient according to equation (16). In terms of equation (22), for each pixel there are: three data fetches, three multiplies, and three additions. Once all of the pixel data are processed, there remain three data fetches, 4 multiplies, two subtracts, and one divide. This savings in computation time can translate into significantly higher inspection rates.

The vectors that must be stored for each trained character are $m_x(K)$ and $q_x(K)$ as defined in equations (7) and (8). These vectors are easily updated with new observations of the trained character x as defined in equations (12) and (13). These vectors can be conveniently stored as unsigned bytes, assuming the image is digitized to 256 gray levels, which is typically the case. However, prior to inspection, the vectors $w_x$ and $m_{wx}$ must be created using equations (11) and (17) respectively. These two vectors are used in the correlation computation of equation (22). The above approach provides a computational and memory efficient solution to the above mentioned deficiencies associated with the state of the art correlation method for performing character recognition.

The object of this invention is to provide a compute and memory efficient character recognition method that overcomes the deficiencies associated with the state of the art correlation method. This is accomplished by placing more emphasis, i.e. increasing the weight, on those pixels of a character that are observed to have low noise and decreasing the weight of those pixels that are observed to have high noise. More particularly, in accordance with this invention, a method of character recognition, comprises the steps of:

(1) font training or creating a font of trained characters by:

(a) acquiring an image composed of a two dimensional array of pixels;

(b) locating all of the characters in the image by selectively scanning columns or rows of a predetermined area of the image and comparing each pixels intensity with a reference level to determine the first pixel of each character and recording the location (column and row coordinates) of such pixel and identifying the other pixels adjacent to the first whose intensity also exceeds the reference level and recording the upper left and lower right coordinates of a box bounding each character;

(c) identifying (labeling) all located characters;

(d) creating all newly trained characters by storing to memory as the initial values for their mean vectors $m_x$ and their mean-square vectors $q_x$ the observed light values of each pixel for each of the trained characters;

(e) updating all previously trained characters by updating each trained characters mean vector $m_x$ and mean-square vector $q_x$ with its most recent observation vector x according to the equations $$m_x(K+1) = \frac{K \cdot m_x(K) + x_{K=1}}{K+1}$$

$$q_x^2(K+1) = \frac{K \cdot q_x^2(K) + x_K^2 + 1}{K+1}$$

wherein $m_x(K+1)$ and $q_x(K+1)$ are the newly updated mean and mean-square vectors, $m_x(K)$ and $q_x(K)$ are the previously updated mean and mean-square vectors, $x_{k+1}$ is the most recent vector of observed light values for the trained character, and K is the number of previous observations for each trained character;

(f) repeating steps (a) thru (e) for every image in the training set;

(g) determining a weight vector $w_x$ and a weighted-mean vector $m_{wx}$ for every trained character in the font according to the equations $$\sigma_x^2 = q_x^2 - m_x^2$$
$$w_x = c/\sigma_x$$
$$(m_{wx})_i = w_{xi}m_{xi}$$
$$i = 1, 2, \ldots N$$

wherein $m_x$ and $q_x$ were defined in steps (d) and (e), $s^2x$ is a variance vector, $w_{xi}$ is the i-th component of the weight vector, $m_{xi}$ is the i-th component of the mean vector, c is a scaling constant and N is the number of pixels in each trained character;

(2) recognizing unknown characters by:

(h) acquiring a two dimensional array of pixels;

(i) locating all unknown characters in a manner described in (b);

(j) computing statistically weighted correlation coefficients between all unknown characters and the trained character set using the weights and weighted-means for each trained character determined in step (g); and (k) identifying all unknown characters as those trained characters with the highest weighted correlation coefficients above a threshold.

DESCRIPTION OF THE DRAWINGS

FIG. 3A shows the flow chart illustrating the decision logic to choose inspect or training;

FIG. 3B shows the flow diagram for the inspect control logic;

FIG. 3C shows the flow diagram for the font training logic; and

DETAILED DESCRIPTION OF THE PREFERRED EMBODIMENT

Figure 1:
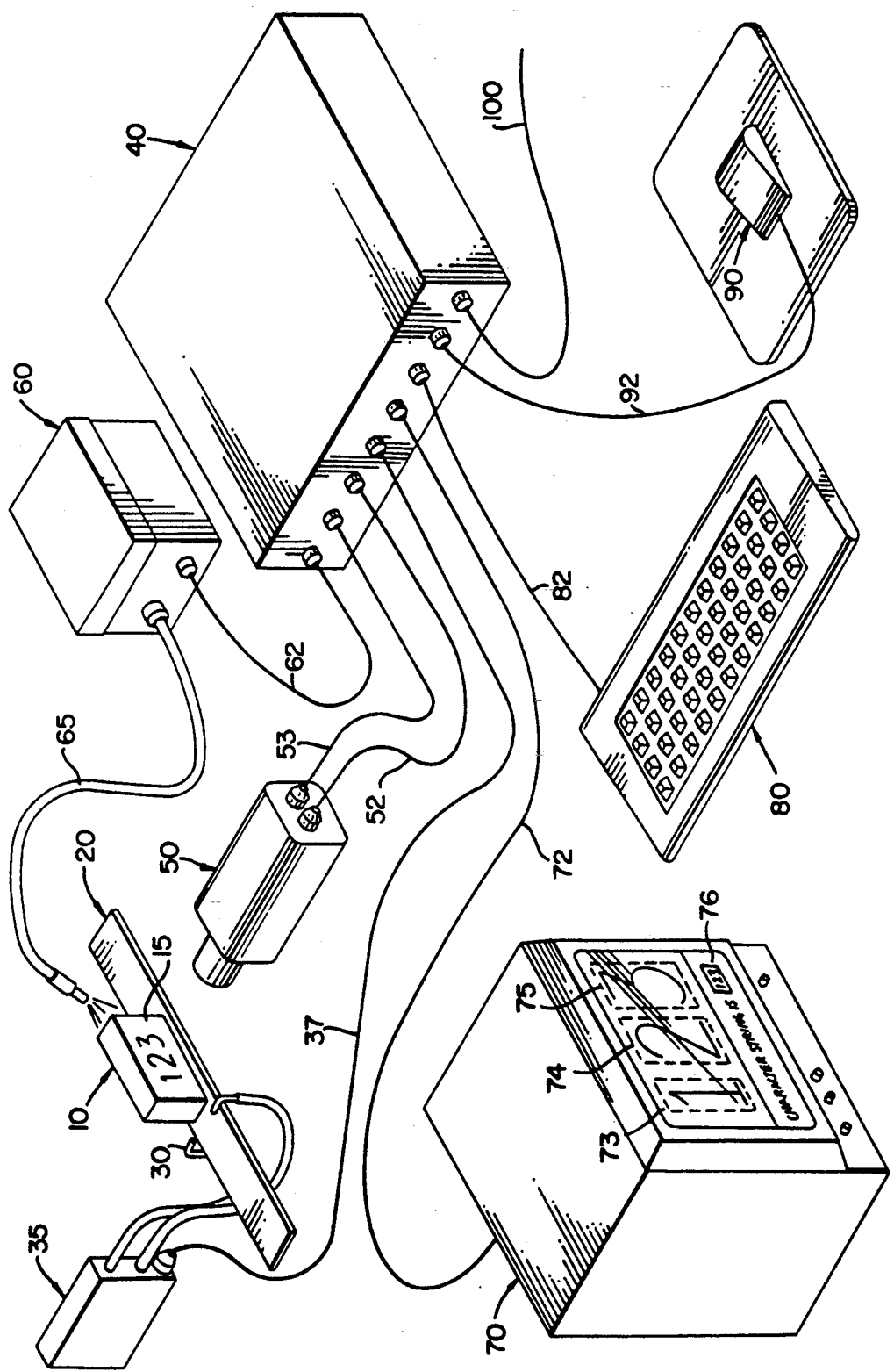
FIG. 1 is an illustration of an embodiment of the character recognition method in accordance with the present invention.

Referring to FIG. 1 there is shown the components of the preferred embodiment. There is a part 10 with printed characters 15 that are to be recognized. The part is moving on a conveyance unit 20 and is detected by an electro-optic sensor 30. Upon detection of the part, the electro-optic position sensor sends a signal to the sensor transducer unit 35. The transducer signals the logic and control unit 40 that the part is present in the field of view of the video camera 50 via the part detect cable 37.

Upon receipt of the part detect signal, the logic and control unit commands a stroboscopic light source 60 via the light source trigger cable 62 to generate a pulse of light given that the video camera is ready to capture the next video frame. The logic and control unit knows when the camera is ready to capture the next video frame since it controls the timing of the camera via the video sync cable 53.

The pulsed light from the stroboscopic light source illuminates the moving part via the fiber-optic bundle 65. The pulsed light essentially "freezes" the moving part and renders a sharp image of it when captured by the video camera 50.

Upon the capture of an image, the analog video signal is transferred from the camera to the logic and control unit 40 via the video cable 52. The logic and control unit displays the processed video image along with superimposed text on a video monitor 70 via the monitor cable 72. The type of information displayed on the monitor depends on whether the logic and control unit is in the training mode or the inspect mode, the details of which are described below with reference to FIGS. 3B and FIG. 3C. The example monitor display of FIG. 1 shows the results of an sample inspection. The captured image is displayed and boxes 73, 74 and 75 are drawn around the three characters that the logic and control unit has located in this example. Also shown on the monitor is textual information 76 indicating what classification the logic and control unit has assigned to the three located characters (in this example they are shown correctly classified as the letters '1', '2', and '3') as the result of an inspection.

A keyboard 80 and a pointing device (mouse) 90 are also shown to provide a means for user input to the logic and control unit. The keyboard is interfaced to the logic and control unit via the keyboard cable 82. The pointing device is interfaced to the logic and control unit via the pointing device cable 92.

An interface to a host computer 100 provides a means for communicating the results of the inspection to another processing unit for defect sorting and/or statistical analyses.

Figure 2:
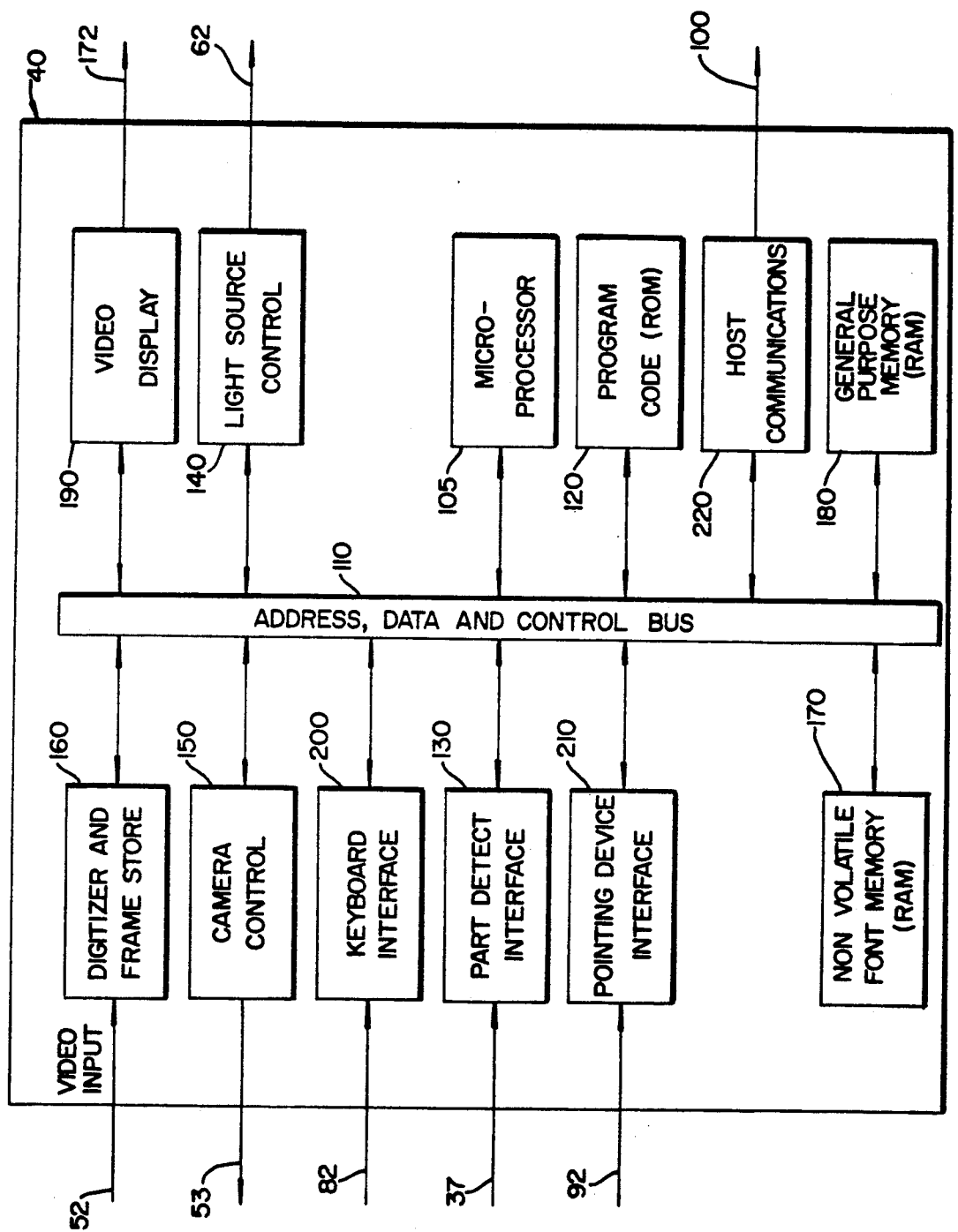
FIG. 2 is a schematic of the logic and control unit 40 of FIG. 1.

FIG. 2 shows in block diagram form the components of the logic and control unit 40, the details of which are described below. A microprocessor 105 acts as the main controller of the logic and control unit and receives input and provides output to the other components of FIG. 2 via the address, data, and control bus 110. The microprocessor receives its' instructions from program code stored in nonvolatile memory (ROM) 120

A part detect interface 130 receives the part detect signal from the sensor transducer unit 35 via the part detect cable 37. The part detect interface signals the microprocessor when a part is in the field of view of the video camera. The microprocessor triggers the light source 60 via the light source interface 140 at the precise instant in time when the camera 50 is capable of capturing a video frame. The camera control module 150 provides the timing signals to the camera via the video sync cable 53 and alerts the microprocessor when the camera is ready to capture the next video frame.

The analog video output from the camera is digitized and stored upon command from the microprocessor by the digitizer and frame store module 160. The digitized video is accessible by the microprocessor for locating characters and computing correlation coefficients in a manner described below with reference to FIGS. 3B and 3C.

The data associated with the trained characters in a font are stored in a block of memory, preferably nonvolatile, labeled font memory 170. Font memory contains all the pixel data associated with each trained character including the mean and the weight vectors that are used to compute correlation coefficients. The trained character data are addressed by the microprocessor via a list of pointer references stored in the general purpose memory 180. The general purpose memory provides a means for storing additional data as described below with reference to FIGS. 3A thru 3C.

The video data from the digitizer and frame store 160 are displayed on a monitor by means of the video display module 190 and the monitor cable 72. The microprocessor has the capability of overlaying graphics and textual information on top of the video to provide the user a means of viewing the results of an inspection and to prompt the user during font training.

The keyboard interface module 200 and the pointing device interface module 210 provide the interface from the keyboard and pointing device units and alerts the microprocessor when a key is pressed.

Figure 3A:
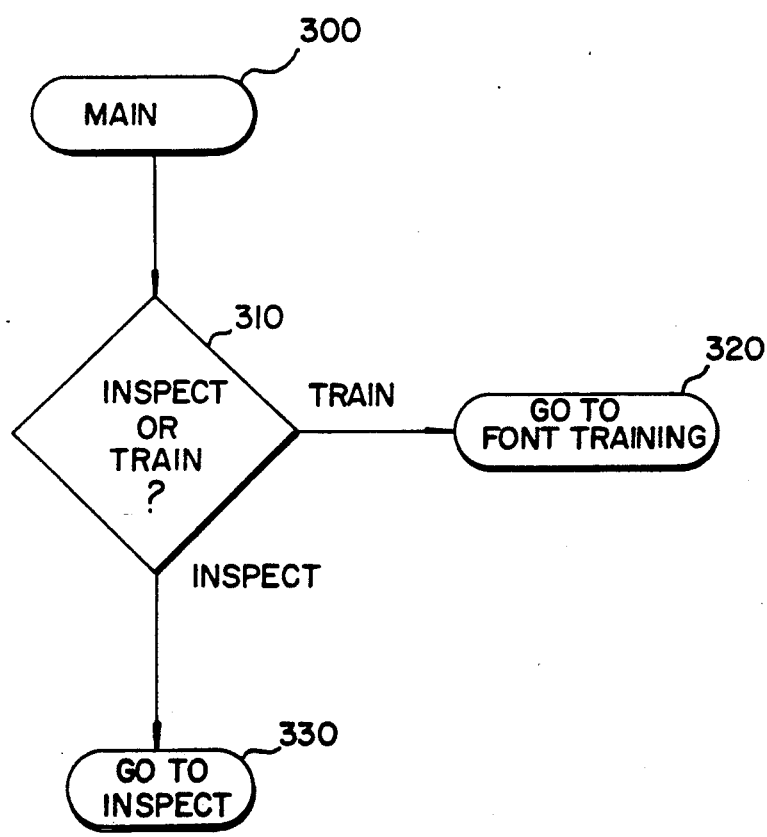
FIGS. 3A thru 3C are flow charts illustrating an embodiment of the control logic followed by the logic and control unit 40 of FIG. 2.

The host communications module 220 provides the interface from the microprocessor to a host computer and provides the gateway for sending the results of an inspection for subsequent sorting or statistical analysis FIG. 3A shows a flow diagram illustrating a portion of the logic followed by the logic and control unit 40. Control begins with the main label 300. This is the beginning of the control loop. The user is then queried as to whether the unit is to inspect or a font is to be trained 310. This question appears on the video monitor 70. The user responds via the keyboard 80 or pointing device 90 and control is directed either to font training 320 or inspect 330.

Figure 3B:
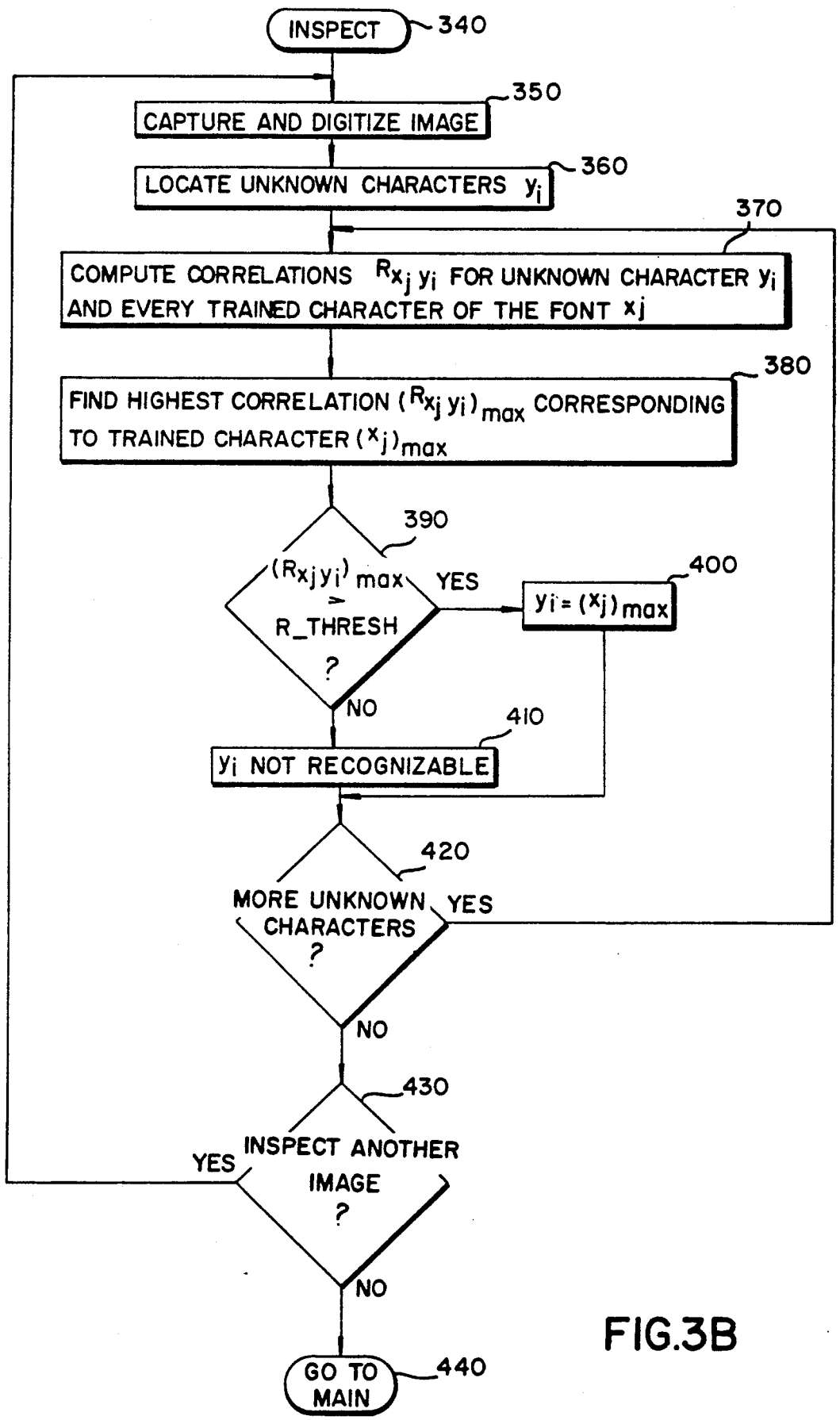

FIG. 3B shows a flow diagram illustrating the inspect portion of the logic followed by the logic and control unit 40. Inspect begins with the inspect label 340 and is followed by the capture and digitization of an image 350 step upon the receipt of a part detect signal as discussed previously with reference to FIG. 1 and FIG. 2.

Next, all of the unknown characters are located in a predefined region of interest in the image 360. This is accomplished by selectively scanning columns or rows of the predefined area of the image and comparing the light value of each pixel with a reference value to determine the first pixel of each unknown character and recording the location (column and row coordinates) of such pixel and identifying the other pixels adjacent to the first whose intensity also exceeds the same reference level and thus determining and recording the upper left and lower right coordinates of a box bounding each unknown character. Once all of the unknown characters have been located, each unknown character $y_i$ is then recognized by computing the statistically weighted normalized mean-corrected correlation (squared) $R^2_{xy}$ according to equation (22) with every trained character of the font $x_j$ j = 1, 2, . . . , M where M is the number of trained characters in the font 370.

Next, the trained character $(x_j)_{max}$ corresponding to the highest correlation $(R^2_{xy})_{max}$ is determined by sorting the correlation scores 380. A comparison is made of the highest correlation score $(R^2_{xy})_{max}$ with a predetermined threshold $R_{thresh}$ 390. If the threshold is exceeded, then the unknown character $y_i$ is identified as $(x_j)_{max}$ 400 and is reported to the user via the video monitor 70 and to the host computer via the host computer interface 100. Otherwise, the unknown character is judged as not recognizable 410 and is reported to the user and the host computer as such. A test is made to check for additional unknown characters 420 and if true then steps 370 thru 410 are repeated. The logic and control unit will loop back to capture another image if in a continuous inspect mode 430, otherwise it will branch back to main 440.

Figure 3C:
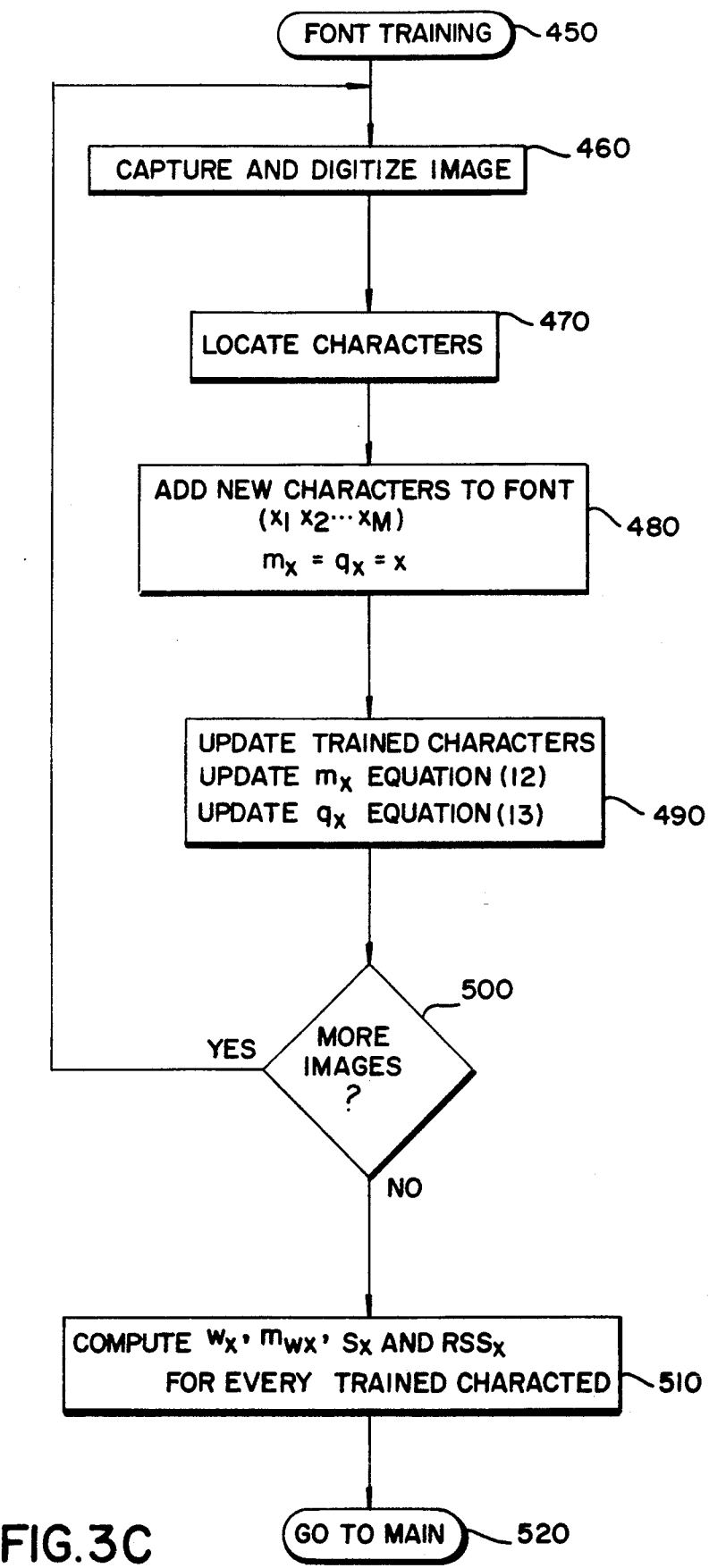

FIG. 3C shows a flow diagram illustrating the font training portion of the logic followed by the logic and control unit 40. Training begins with the font training label 450 and is followed by the capture and digitization of an image 460 step upon the receipt of a part detect signal as discussed previously with reference to FIG. 1 and FIG. 2.

Next, all of the characters are located in a predefined region of interest in the image 470. This is accomplished in exactly the same manner as the procedure described for locating characters in the Inspect process of FIG. 3B. The located characters are displayed on the video monitor with a box bounding each character and the user is prompted for a label for each character. The pixel data for each new trained character x are then extracted from the image and saved as initial estimates of the mean vector $m_x$ and the mean square vector $q_x$ as defined by equations (7) and (8). These data are stored in the Font Memory 170 portion of the logic and control unit 480. All previously trained characters are updated with the most recent observations x 490. This involves computing new values for $m_x$ and $q_x$ according to the recursive update equations (12) and (13). In this manner, the font is statistically trained from multiple observations of characters from a training set consisting of many images 500.

After the training set has been "learned", the weight vector $w_x$, the weighted mean vector $m_{wx}$, and the two quantities $S_x$ (equation (20)) and $RSS_x$ (equation (21)) are computed and stored in Font Memory for every trained character in the font. These data are used during inspect when calculating correlation coefficients according to equation (22) 370.

Figure 4A:
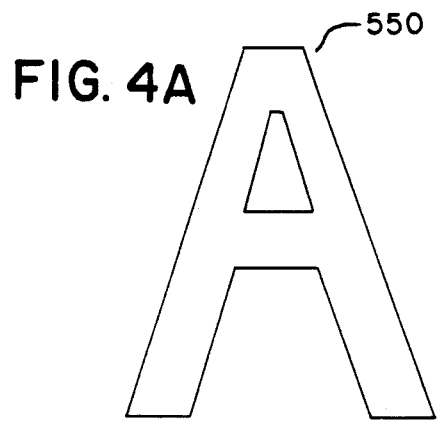
FIGS. 4A-D graphically illustrate how statistical weighting places more or less emphasis on those areas of a character with varying amounts of noise.

FIGS. 4A–D present a graphic illustration of how the statistical weighting places more emphasis on those areas of a character with less noise as opposed to those areas of a character with more noise. FIG. 4A (550) shows a thick letter A. The interior of the letter has a constant reflectance which is substantially different from the background.

Figure 4B:
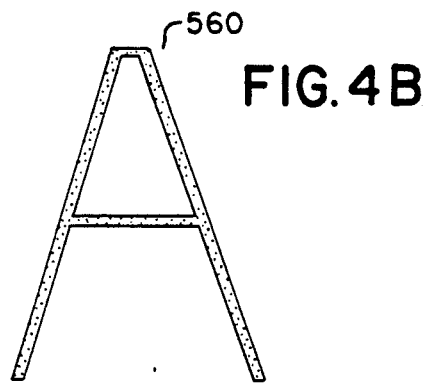
Figure 4C:
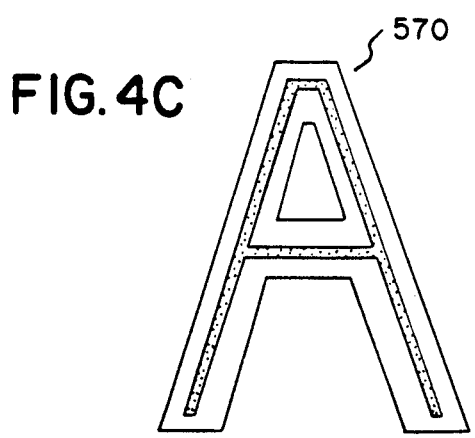
Figure 4D:
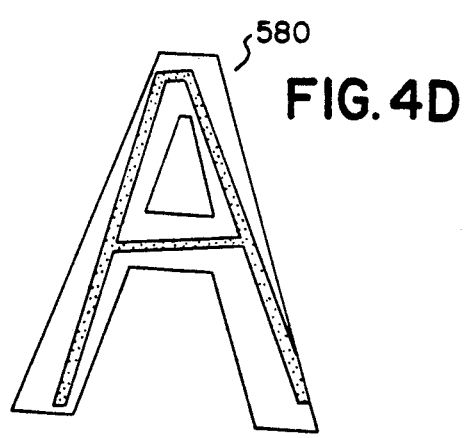

After viewing many observations of this letter according to the flow diagram shown in FIG. 3C, the weighted mean 'A' is computed according to equation (17) and is shown in the FIG. 4B (560). The weighted mean 'A' is a "skeletonized" version of the original 'A' and is a result of the statistical weighting process of the invention. That is, those areas along the edges of the trained character have higher noise and are thus weighted less than the interior areas of the trained character. This is further illustrated in FIG. 4C (570) by superimposing the original 'A' and the weighted-mean 'A' FIG. 4D (580) shows the insensitivity to small amounts of rotation afforded by this technique. In FIG. 4D the original 'A' is rotated slightly (~7°) relative to the weighted mean 'A'. In this case, relatively high correlations will occur since the weighted mean 'A' lies entirely within the "thick" 'A'.

The invention has been described in detail with particular reference to a preferred embodiment thereof, but it will be understood that variations and modifications can be effected within the spirit and scope of the invention. Such variations could include, but are not limited to, document scanners which scan the document with a linear, one dimensional, scanner one line at a time and build the image sequentially in a digital frame store. For example, the documents could contain text composed of multiple fonts with various styles such as bold or italic.

We claim:

1. A method of character recognition, comprising the steps of:
   1) font training or creating a font of trained characters by:
      (a) acquiring an image composed of a two dimensional array of pixels;
      (b) locating all of the characters in the image by selectively scanning columns or rows of a predetermined area of the image and comparing each pixels intensity with a reference level to determine the first pixel of each character and recording the location (column and row coordinates) of such pixel and identifying the other pixels adjacent to the first whose intensity also exceeds the reference level and recording the upper left and lower right coordinates of a box bounding each character;
      (c) identifying (labeling) all located characters;
      (d) creating all newly trained characters by storing to memory as the initial values for their mean vectors $m_x$ and their mean-square vectors $q_x$ the observed light values of each pixel for each of the trained characters;
      (e) updating all previously trained characters by updating each trained characters mean vector $m_x$ and mean-square vector $q_x$ with its' most recent observation vector x according to the equations $$m_x(K+1) = \frac{K \cdot m_x(K) + x_{K=1}}{K+1}$$

$$q_x^2(K+1) = \frac{K \cdot q_x^2(K) + x_K^2 + 1}{K+1}$$

wherein $m_x(K+1)$ and $q_x(K+1)$ are the newly updated mean and mean-square vectors, $m_x(K)$ and $q_x(K)$ are the previously updated mean and mean-square vectors, $x_{k+1}$ is the most recent vector of observed light values for the trained character, and K is the number of previous observations for each trained character;
      (f) repeating steps (a) thru (e) for every image in the training set;
      (g) determining a weight vector $w_x$ and a weighted-mean vector $m_{wx}$ for every trained character in the font according to the equations $$\sigma_x^2 = q_x^2 - m_x^2$$
$$w_x = c/\sigma_x$$
$$(m_{wx})_i = w_{xi}m_{xi}$$
$$i = 1, 2, \ldots N$$

wherein $m_x$ and $q_x$ were defined in steps (d) and (e), $\sigma^2 x$ is a variance vector, $w_{xi}$ is the i-th component of the weight vector, $m_{xi}$ is the i-th component of the mean vector, c is a scaling constant and N is the number of pixels in each trained character;
   (2) recognizing unknown characters by:
      (h) acquiring a two dimensional array of pixels;
      (i) locating all unknown characters in a manner described in (b);
      (j) computing statistically weighted correlation coefficients between all unknown characters and the trained character set using the weights and weighted-means for each trained character determined in step (g); and
      (k) identifying all unknown characters as those trained characters with the highest weighted correlation coefficients above a threshold.

2. The method of claim 1 wherein the character location step (a) is provided by a connectivity algorithm.

* * * * *